(12) United States Patent
Koshita et al.

(10) Patent No.: US 12,202,951 B2
(45) Date of Patent: Jan. 21, 2025

(54) MODIFIED EXPANDED BEAD AND FOAM MOLDED ARTICLE OF EXPANDED BEADS

(71) Applicant: JSP CORPORATION, Chiyoda-ku (JP)

(72) Inventors: Nobumasa Koshita, Tokyo (JP); Hajime Ohta, Tochigi (JP); Shota Takagi, Tokyo (JP)

(73) Assignee: JSP CORPORATION, Chiyoda-ku (JP)

( * ) Notice: Subject to any disclaimer, the term of this patent is extended or adjusted under 35 U.S.C. 154(b) by 644 days.

(21) Appl. No.: 17/617,521

(22) PCT Filed: Apr. 2, 2020

(86) PCT No.: PCT/JP2020/015171
§ 371 (c)(1),
(2) Date: Dec. 8, 2021

(87) PCT Pub. No.: WO2020/261694
PCT Pub. Date: Dec. 30, 2020

(65) Prior Publication Data
US 2022/0306827 A1     Sep. 29, 2022

(30) Foreign Application Priority Data

Jun. 27, 2019   (JP) .................... 2019-119239

(51) Int. Cl.
*C08J 9/16*      (2006.01)
*C08J 9/18*      (2006.01)
(Continued)

(52) U.S. Cl.
CPC .............. *C08J 9/18* (2013.01); *C08J 9/224* (2013.01); *C08J 9/232* (2013.01);
(Continued)

(58) Field of Classification Search
CPC ..... C08J 9/18; C08J 9/224; C08J 9/232; C08J 2201/026; C08J 2201/03; C08J 2300/22;
(Continued)

(56) References Cited

U.S. PATENT DOCUMENTS 10,435,530 B2   10/2019   Takagi et al.
10,487,188 B2   11/2019   Kitahara et al.
(Continued)

FOREIGN PATENT DOCUMENTS

CN    105579502 A    5/2016
JP    4-77532 A      3/1992
(Continued)

OTHER PUBLICATIONS

Extended European Search Report issued Nov. 8, 2022 in European Patent Application No. 20833152.0, 41 pages.
(Continued)

*Primary Examiner* — K. Boyle
(74) *Attorney, Agent, or Firm* — Oblon, McClelland, Maier & Neustadt, L.L.P.

(57) ABSTRACT

A modified expanded bead that includes an expanded bead which includes a specific base polymer ($\beta$) and a coating layer which includes a specific base polymer ($\alpha$). The coating layer covers at least part of an outer surface of the expanded bead. The melting point $T\alpha$ of the base polymer ($\alpha$) and the melting point $T\beta$ of the base polymer ($\beta$) satisfy a relationship of $0 \leq T\alpha - T\beta \leq 20$. When the modified expanded bead is cut into two halves along a cutting plane to form two half portions and thereafter one of the two half portions is cut along planes perpendicular to the cutting plane to form ten small pieces, outermost pieces among the ten small pieces have a xylene-insoluble content (B) which is less than a xylene-insoluble content (A) in the half portion and the xylene-insoluble content (A) is 10-80% by mass.

9 Claims, 2 Drawing Sheets

(51) Int. Cl.
  *C08J 9/224* (2006.01)
  *C08J 9/232* (2006.01)
(52) U.S. Cl.
  CPC ...... *C08J 2201/026* (2013.01); *C08J 2201/03* (2013.01); *C08J 2300/22* (2013.01); *C08J 2300/26* (2013.01); *C08J 2323/06* (2013.01)
(58) Field of Classification Search
  CPC .......................... C08J 2300/26; C08J 2323/06; C08J 2353/00; C08J 2423/06
  See application file for complete search history.

(56) References Cited

U.S. PATENT DOCUMENTS

| | | | |
|---|---|---|---|
| 2017/0009038 | A1 | 1/2017 | Shinohara et al. |
| 2018/0127559 | A1* | 5/2018 | Takagi ..................... C08J 9/232 |
| 2018/0251619 | A1 | 9/2018 | Shinohara et al. |
| 2018/0345576 | A1 | 12/2018 | Constantinou et al. |
| 2019/0270861 | A1 | 9/2019 | Takagi et al. |

FOREIGN PATENT DOCUMENTS

| | | |
|---|---|---|
| JP | 4-118224 A | 4/1992 |
| JP | 2000-344928 A | 12/2000 |
| JP | 2003-39565 A | 2/2003 |
| JP | 2004-249558 A | 9/2004 |
| JP | 2005-23302 A | 1/2005 |
| JP | 2016-69471 A | 5/2016 |
| JP | 2016-160300 A | 9/2016 |
| WO | WO 2016/181714 A1 | 11/2016 |
| WO | WO 2017/010494 A1 | 1/2017 |
| WO | WO 2018/084245 A1 | 9/2019 |

OTHER PUBLICATIONS

Combined Chinese Office Action and Search Report issued Oct. 9, 2022 in Patent Application No. 202080031832.3 (with English machine translation and English translation of Category of Cited Documents), 16 pages.

International Search Report mailed on Jun. 30, 2020 in PCT/JP2020/015171 filed on Apr. 2, 2020 (3 pages).

International Preliminary Report on Patentability and Written Opinion issued Jan. 6, 2022 in PCT/JP2020/015171 (submitting English translation only), 7 pages.

Japanese Office Action issued Oct. 4, 2022 in Japanese Patent Application No. 2019-119239 (with unedited computer generated English translation), 11 pages.

* cited by examiner

MODIFIED EXPANDED BEAD AND FOAM MOLDED ARTICLE OF EXPANDED BEADS

CROSS-REFERENCE

This application is the US national stage of International Patent Application No. PCT/JP2020/015171 filed on Apr. 2, 2020, which claims priority to Japanese Patent Application No. 2019-119239 filed on Jun. 27, 2019.

TECHNICAL FIELD

The present invention relates to a modified expanded bead and a foam molded article.

BACKGROUND ART

Recently, a molded foam article which includes an ethylene/α-olefin copolymer has been used in a seat cushion, a sports pad, a shoe sole, etc. which are required to have high resilience, high flexibility, and high restorability. Such type of molded foam article can be made by in-mold molding expanded beads. For example, in Patent Document 1, expanded beads formed by a block copolymer of polyethylene block and ethylene/α-olefin copolymer block have been described.

PRIOR ART LITERATURE

Patent Document

Patent Document 1: WO 2018/084245 A1

SUMMARY OF THE INVENTION

Problem to be Solved by the Invention

The expanded beads disclosed in Patent Document 1 have a tendency of dropping of fusion among the expanded beads within the foam molded article when manufacturing a thick large-sized foam molded article of expanded beads or a complicated shape foam molded article of expanded beads. Accordingly, in order to improve fusion, for example, a method in which a degree of cross-linking of the block polymer is lowered, can be considered. However, if such degree of cross-linking of the block polymer is lowered, the molding restorability after in-mold molding may drop, and the central portion of the foam molded article of expanded beads after in-mold molding may become easy to shrink.

As stated, the expanded beads in Patent Document 1 still have a room for further improvements in moldability when performing an in-mold molding of the expanded beads. Thus, expanded beads which have both excellent fusion and excellent molding restorability have still been desired.

The present invention has been made considering the above background and it pertains to provide a modified expanded bead excellent in fusion and at the same time excellent in molding restorability and a foam molded article of expanded beads obtained by in-mold molding the modified expanded bead(s).

Means for Solving the Problem

One aspect of the present invention resides in a modified expanded bead which includes an expanded bead and a coating layer which covers at least part of an outer surface of the expanded bead; wherein, the expanded bead includes a base polymer (a) including an olefin-based thermoplastic elastomer;

the coating layer includes a base polymer (B) including one or more kinds of an olefin-based thermoplastic polymer selected from a group consisting of polyolefin-based resin and an olefin-based thermoplastic elastomer;

a relationship between a melting point $T\alpha$ [C] of the base polymer ($\alpha$) and a melting point $T\beta$ [° C.] of the base polymer ($\beta$) satisfies $0 \leq T\alpha - T\beta \leq 20$; and when the modified expanded bead is cut into two halves along a cutting plane to form two half portions, and thereafter one of the two half portions is cut along planes perpendicular to the cutting plane to form ten small pieces, each small piece having an equal thickness to one another, outermost pieces among the ten small pieces have a xylene-insoluble content (B) which is less than a xylene-insoluble content (A) of another half portion, and the xylene-insoluble content (A) is equal to or more than 10% by mass and equal to or less than 80% by mass.

Effects of the Invention

The modified expanded bead comprises the expanded bead including the base polymer ($\alpha$), and the coating layer including the base polymer ($\beta$) and covering at least part of the outer surface of the expanded bead. The difference ($T\alpha - T\beta$) between the melting point $T\beta$ of the base polymer ($\beta$) and the melting point $T\alpha$ of the base polymer ($\alpha$) satisfies the specific relationship defined above. Further, the xylene-insoluble content (B) of the small pieces positioned outermost sides among the ten small pieces obtained by dividing the modified expanded bead according to the method stated above is lower than the xylene-insoluble content (A) of the other half portions. In other words, the modified expanded bead is configured such that the xylene-insoluble content of the coating layer is set to be smaller than that of the expanded bead.

As stated, by setting the xylene-insoluble content of the coating layer including the specified base polymer ($\beta$) lower than the xylene-insoluble content of the expanded bead, fusion of the coating layers, while performing the in-mold molding, can be easily made and as a result, the fusion performance with each other of the modified expanded bead can be improved.

Further, in the expanded bead including the specific base polymer ($\alpha$), by raising the xylene-insoluble content of the expanded bead to be higher than the xylene-insoluble content of the coating layer, the shrinkage of the foam molded article of expanded beads after in-mold molding can be prevented. As a result, the molding restorability of the foam molded article can be improved.

Thus, according to the aspect of the invention stated above, it is possible to provide a modified expanded bead which is excellent in both fusion and molding restorability.

MODE FOR CARRYING OUT THE INVENTION

Modified Expanded Bead

In the modified expanded bead, at least part of the outer surface of the expanded bead is covered by the coating layer. In other words, the coating layer may cover the entire outer surface of the expanded bead or may cover a part thereof. In the latter case, the modified expanded bead may be in the form of a so-called sheath core structure, wherein the outer surface of the expanded bead of the modified expanded bead is wound around by the coating layer in a belt-like shape. It is noted here that a modified expanded bead having the sheath core structure may be referred to as "a multi-layered expanded bead".

The mass ratio of the expanded bead and the coating layer is preferably set to be bead/coating layer=70:30 to 99.5:0.5. Within such a ratio, excellent fusion and high molding restorability can be both achieved when the in-mold molding is performed.

Expanded Bead

The expanded bead of the modified expanded bead is formed of an expanded body including an olefin-based thermoplastic elastomer as the base polymer ($\alpha$).

The melting point T$\alpha$ of the base polymer ($\alpha$) is preferably equal to or more than 110° C. and equal to or less than 130° C. At such a melting point, fusion among the modified expanded beads and molding restorability can be further improved at the time of in-mold molding.

The melting point T$\alpha$ of the base polymer ($\alpha$) can be measured based on the transition temperature measurement method for plastics defined in JIS K7121-1987. As the test piece, a half portion which is used for the measurement of the xylylene-insoluble content (A) can be used, i.e., a half portion of the modified expanded bead, which is one of the half pieces cut into two equal halves along the cutting plane, can be used.

In concrete, the temperature is raised from 30° C. up to 200° C. with a temperature rising speed of 10° C./min., based on the measurement method of heat flux differential scanning calorimetry defined by JIS K7121-1987. Thereafter, the temperature is dropped down to 30° C. with the temperature dropping speed of 10° C./min. The peak temperature of the endothermic peak which is determined by the DSC curve showing the temperature re-raising curve raised from the temperature of 30° C. up to 200° C. with the temperature rising speed of 10° C./min. can be defined to be the melting point T$\alpha$ of the base polymer ($\alpha$). It is noted here that when a plurality of endothermic peaks appears on the DSC curve obtained at the second-time temperature rising, the endothermic peak that indicates the largest area among the plurality of endothermic peaks is selected as the melting point T$\alpha$ of the base polymer ($\alpha$).

The olefin-based thermoplastic elastomer included in the base polymer ($\alpha$) may be a block copolymer formed by the polyethylene block and ethylene/$\alpha$-olefin copolymer block. In such copolymer block, at least the polyethylene block, as the hard segment, and the ethylene/$\alpha$-olefin copolymer, as the soft segment are included. It is preferable for the block copolymer to be formed by the polyethylene block and the ethylene/$\alpha$-olefin copolymer block. It is further preferable for the polyethylene block and ethylene/$\alpha$-olefin copolymer block to be connected linearly.

The ratio of the ethylene/$\alpha$-olefin copolymer block included in the block copolymer is preferably 1% by mass or more and 99% by mass or less of the mass of the block copolymer and further preferably 5% by mass or more and 95% by mass or less. It is noted here that the ratio of the ethylene block and the ethylene/$\alpha$-olefin copolymer block included in the block copolymer can be obtained by calculation based on a DSC chart in the measurement of differential scanning calorimetry or based on an NMR chart in the nuclear magnetic resonance.

The block copolymer may be formed of a di-block structure or may be formed of a tri-block structure. Further, a multi-block structure may be applicable. Among the above structures of the block copolymer, it is preferable to have a multi-block structure. As an example of such multi-block structured block copolymer, "Infuse (registered trademark)" made by Dow Chemical can be used.

In the polyethylene block in the block copolymer, at least a structural unit derived from ethylene is included. A structural unit derived from a monomer other than ethylene may be included in the polyethylene block, but it is preferable to include the structural unit derived from ethylene in the polyethylene block with a ratio of more than 95% by mass or more than 98% by mass.

Further, in the ethylene/$\alpha$-olefin copolymer block, at least the structural unit derived from ethylene and a structural unit derived from $\alpha$-olefin are included. The mass ratio of the structural unit(s) derived from the $\alpha$-olefin in the ethylene/$\alpha$-olefin copolymer block is preferably more than 5% by mass, further preferably more than 10% by mass or more, and still further preferably more than 15% by mass.

In the ethylene/$\alpha$-olefin copolymer block, one kind of structural unit derived from $\alpha$-olefin may be included, or two kinds or more of structural units derived from $\alpha$-olefin may be included. The $\alpha$-olefin preferably has a carbon number of three (3) or more and twenty (20) or less. As $\alpha$-olefin, for example, propylene, 1-butene, 1-pentene, 1-hexene, 1-heptene, 1-octene. 1-nonene, 1-decene, 3-methyl-1-butene, 4-methyl-1-pentene, etc., may be usable. From the various viewpoints, such as easiness of availability, various performance characteristics, and economical point, as $\alpha$-olefin, one or two kinds selected from propylene, 1-butene, 1-hexene, and 1-octene is preferably used and particularly 1-octene is more preferably used.

It is preferable that the bending elastic modulus of the olefin-based thermoplastic elastomer is 5 to 50 MPa and, more preferably, is set to be 10 to 30 MPa. It is noted here that the bending elastic modulus of the olefin-based thermoplastic elastomer can be measured in accordance with the measurement method defined in JIS K7171:2008.

The base polymer ($\alpha$) may include a polymer other than the olefin-based thermoplastic elastomer, as long as such alternative polymer may not impair the operation and effects thereof mentioned above. Such other applicable polymers, a thermoplastic resin such as, for example, polyolefin-based resin, polystyrene-based resin, etc., a thermoplastic elastomer other than the olefin-based thermoplastic elastomer may be used. The content of such polymer is preferably 20 parts by mass or less relative to the 100 parts by mass of the olefin-based thermoplastic elastomer, and more preferably, 10 parts by mass or less and still more preferably 5 parts by mass. It is most preferable to include zero parts by mass of such polymer, i.e., it is most preferable that no polymer other than the olefin-based thermoplastic elastomer is included in the base polymer ($\alpha$).

Further, the expanded beads may include an additive agent, such as antioxidant, UV protection, anti-static agent, flame retardants, flame retardant aid, metal deactivator, conductive filler, etc., as long as such additives may not impair the operation and effects as stated above. The content of such additive agents relative to the 100 parts by mass of the olefin-based thermoplastic elastomer is preferably 20 parts by mass or less and more preferably, 10 parts by mass or less, and still further preferably, 5 parts by mass or less. Further, it is preferable to set the amount of radical scavenger included in the expanded beads to be less than the amount of radical scavenger included in the coating layer when additive, which functions as a radical scavenger, such as antioxidant, light stabilizer, and flame retardants is added to the expanded bead.

Coating Layer:

The coating layer of the modified expanded bead may be formed of a foamed body of the base polymer (β) or may be formed of a non-foamed body. In the base polymer (β) for the coating layer, one or more kinds of olefin-based thermoplastic polymer which is selected from the group consisting of polyolefin-based resin and olefin-based thermoplastic elastomer is included. In other words, the olefin-based thermoplastic polymer included in the base polymer (β) may be formed by the polyolefin-based resin only or may be formed by olefin-based thermoplastic elastomer only. Further, in the base polymer (β), as the olefin-based thermoplastic polymer, both of polyolefin-based resin and olefin-based thermoplastic elastomer may be included.

From the viewpoint of improvement in fusion among modified expanded beads when in-mold molding is performed, it is preferable that in the base polymer (β) 50% by mass or more of the polyolefin-based resin is included, and more preferably, 70% by mass or more thereof is included. It is further preferable that 90% by mass or more of the polyolefin-based resin is included in the base polymer (β), or even furthermore preferable to include 100% by mass of the polyolefin-based resin in the base polymer (β).

The relationship between the melting point Tβ [° C.] of the base polymer (β) and the melting point Tα [° C.] of the base polymer (α) satisfies $0 \leq T\alpha - T\beta \leq 20$. Thus, both fusion among the expanded beads and high-molding restorability after in-mold molding can be satisfied. It is more preferable that the relationship between the melting point Tβ [° C.] of the base polymer (β) and the melting point Tα [° C.] of the base polymer (α) in the expanded beads satisfies the relationship of $5 \leq T\alpha - T\beta \leq 15$.

The melting point Tβ of the base polymer (β) can be obtained by the same method as the method for obtaining the melting point Tα of the base polymer (α). As a test piece, a small piece used for measurement of the xylene-insoluble content (B) is used. In other words, by cutting the modified expanded bead along the cutting plane, which passes through the center of gravity to form half portions, and one of the half portions is then cut along planes perpendicular to the cutting plane to form ten small pieces, each small piece having an equal thickness to one another. The outermost pieces from the ten pieces can be used as the test piece.

As the olefin-based thermoplastic elastomer in the base polymer (β), the olefin-based thermoplastic elastomer of the same kind of the base polymer (α) in the expanded bead can be used.

Further, as the polyolefin-based resin in the base polymer (β), polyethylene-based resin, for example, branched low-density polyethylene, linear low-density polyethylene, high-density polyethylene, ethylene-vinyl acetate copolymer, ethylene-acrylic acid copolymer, ethylene-acrylic acid alkyl ester copolymer, ethylene-methacrylic acid copolymer, ethylene-methacrylic acid alkyl ester copolymer, and polypropylene-based resin, such as propylene homopolymer, propylene-ethylene copolymer, propylene-1-butene copolymer, propylene-ethylene-1-butene copolymer, propylene-4-methyl-1-pentene copolymer, etc., can also be used. One of these polyolefin-based resins may be used, or two or more thereof may also be used.

It is preferable that polyethylene-based resin is included in the base polymer (β) as the olefin-based thermoplastic polymer. In such a case, fusion among the modified expanded beads at the in-mold molding can be further improved. It is further preferable that low-density polyethylene is used for the polyethylene-based resin. In such a case, fusion among the modified expanded beads at the in-mold molding can be further improved, and at the same time, xylene-insoluble content (B), i.e., xylene-insoluble content of the coating layer, can be easily reduced. It is noted that the term "low-density polyethylene" is defined to be polyethylene which density is between 0.91 and 0.93 g/cm$^3$.

The base polymer (β) may include a polymer other than the olefin-based thermoplastic polymer, as long as such alternative polymer may not impair the operation and effects as stated above. Such other applicable polymers, a thermoplastic resin such as, for example, polystyrene-based resin, etc., other than the polyolefin-based resin and a thermoplastic elastomer other than the olefin-based thermoplastic elastomer may be used. Such content of the polymer is preferably 10 parts by mass or less relative to the 100 parts by mass of the olefin-based thermoplastic elastomer and more preferably, 5 parts by mass or less, and it is most preferable to set the amount of the polymer included in the base polymer (β) to be zero part by mass, i.e., it is most preferable not to include such polymer other than the olefin-based thermoplastic polymer in the base polymer (β).

Further, the coating layer may include additive agents, such as UV protection, anti-static agent, metal deactivator and conductive filler, etc., as long as such additive agents may not impair the operation and effects as stated above. The content of such additive agents relative to the 100 parts by mass of the olefin-based thermoplastic polymer is preferably 20 parts by mass or less and more preferably, 10 parts by mass or less, and still further preferably, 5 parts by mass or less.

Xylene-Insoluble Content:

The modified expanded bead is cut along the cutting plane to form two half portions, and one of the cut half portions is then cut along planes perpendicular to the cutting plane to form ten small pieces, each small piece having an equal thickness to one another. The xylene-insoluble content (B) of the outermost pieces of the ten pieces is lower than the xylene-insoluble content (A) of the other half portion. The xylene-insoluble content (A) of the other half portion is 10% by mass or more and 80% by mass or less.

The content of the xylene insoluble in the modified expanded bead becomes high as the degree of cross-linking of the base polymer (α) and the base polymer (β) is high. When the modified expanded bead is divided as stated above, the volume ratio of the coating layer included in such outermost piece tends to be equal to or more than the volume ratio of the coating layer occupied in the entire modified expanded bead. Therefore, the value of xylene-insoluble content (B) reflects the degree of cross-linking of the base polymer (β) included mainly in the coating layer. On the other hand, the volume ratio of the coating layer included in the other half portion becomes similar to the volume ratio of the coating layer occupied in the entire modified expanded beads. Therefore, the value of xylene-insoluble content (A) reflects the degree of cross-linking of the base polymer (β) and the degree of the cross-linking of the base polymer (α) included in the expanded bead.

Accordingly, in the modified expanded bead, where the xylene-insoluble content (B) is lower than the xylene-insoluble content (A), the degree of cross-linking of the base polymer (β) included in the coating layer is low compared to the degree of cross-linking of the base polymer (α) included in the expanded bead. Conventionally, it has been known that when the content of xylene insoluble in the expanded bead is too high, fusion among the expanded beads becomes worse. However, since the modified expanded bead has a coating layer which covers at least part of the outer surface of the expanded bead, it is considered that excellent fusion can be maintained, even if the xylene-insoluble content (A) is higher than conventional content. Accordingly, by the modified expanded beads, coating layers can be easily fused to one another when the in-mold molding is performed.

Further, in the modified expanded bead of which the value of xylene-insoluble content (A) is within the above specified range, the degree of cross-linking of the base polymer (α) included in the expanded bead is already sufficiently high. Therefore, the molding restorability after in-mold molding can be improved. Further, such modified expanded bead is excellent in mechanical properties, such as resilience, flexibility, and restorability, etc., and accordingly, the mechanical properties of the obtained foam molded article of expanded beads can be improved. From such a point of view, the xylene-insoluble content (A) of the half portion is preferably 30% by mass or more and is more preferably 40% by mass or more. Further, the xylene insoluble content (A) is preferably 70% by mass or less and is more preferably 60% by mass or less.

Further, in a case where the base polymer (α) has a crystal structure having a high-temperature peak, even the thermal xylene insoluble content is low, it is considered that expanded bead can be obtained to provide a molded article having excellent tensile characteristics and having no generation of sink which may be generated after removing the mold. Accordingly, when the base polymer (α) has a crystal structure having a high-temperature peak, the xylene insoluble content (A) of the half portion can be set from 15% to 40% by mass. The high-temperature peak can be generated by crystallizing molten crystals keeping the base polymer (α) to around the melting point when the expanded bead is manufactured. It is noted here that the method for generating the high-temperature peak, fusion calories at the high-temperature peak, are obtained using any hitherto known knowledge.

As stated above, by setting the xylene-insoluble content (B) of small pieces, including much coating layers, to the value lower than the xylene-insoluble content (A) included in the half portion and at the same time setting the value of the xylene-insoluble content (A) to be within the specified range, the modified expanded bead which has both excellent fusion and excellent mechanical properties can be obtained.

The xylene-insoluble content (B) is equal to or more than the xylene-insoluble content (A), the degree of cross-linking of the base polymer (β) in the coating layer becomes high, which may lead to worsening of fusion.

When the value of xylene-insoluble content (A) is too small, the degree of cross-linking of the base polymer (α) becomes low, which may lead to worsening of molding restorability. On the other hand, when the value of xylene-insoluble content (A) is too high, worsening of the secondary expandability, i.e., expandability in the in-mold molding process, may occur, which may lead to worsening of moldability. In such a situation, the degree of cross-linking of the base polymer (β) becomes high, which may lead to worsening of fusion.

From the viewpoint of improvement in fusion among the modified expanded beads, it is preferable that the ratio of xylene-insoluble content (B) relative to the xylene-insoluble content (A), that is, B/A is set to be less than 0.95, more preferably set to be less than 0.93, and furthermore preferably set to be less than 0.91. On the other hand, it is preferable that the ratio of xylene-insoluble content (B) relative to the xylene-insoluble content (A), that is, B/A, is set to be about 0.80 or more.

Figure 1:
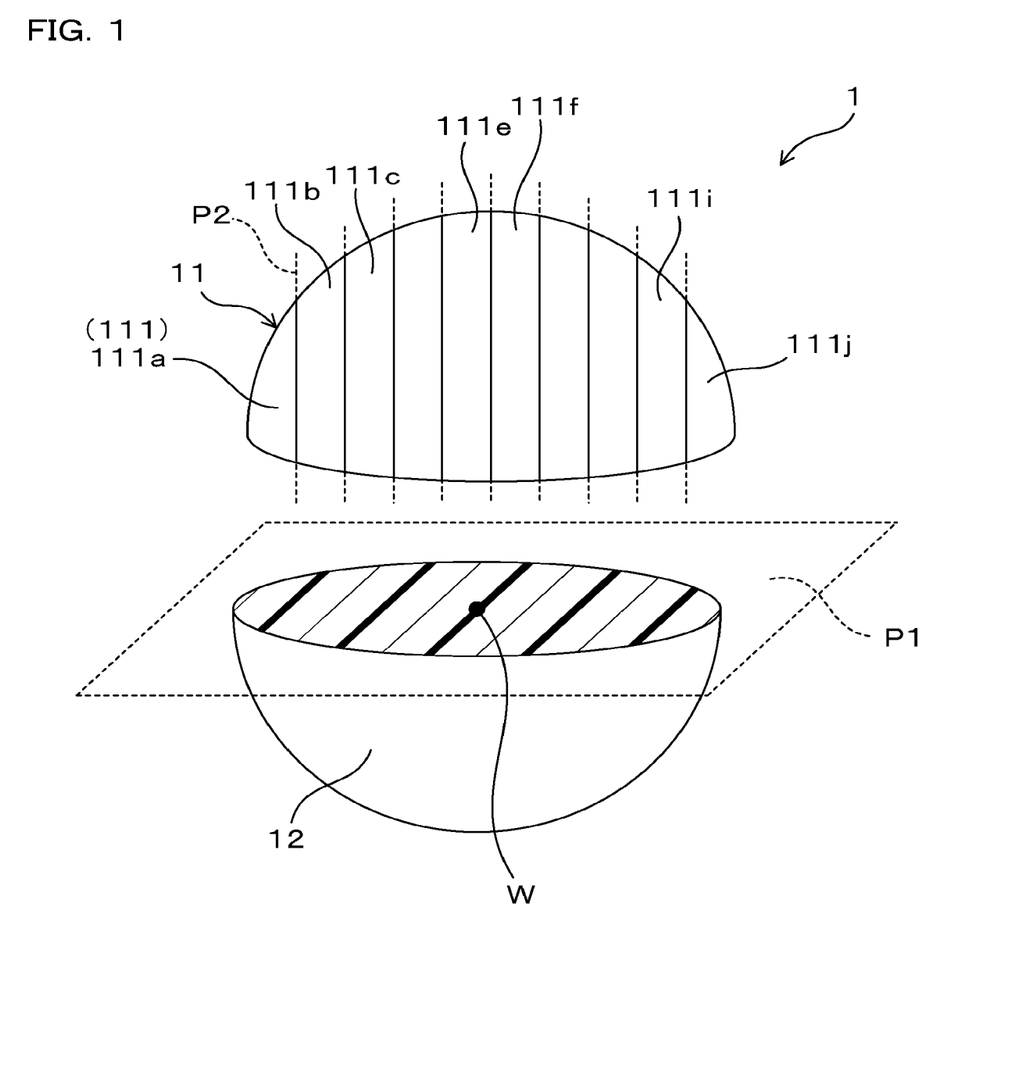
FIG. 1 is an explanatory view showing a dividing method for making small pieces from a modified expanded bead.
Figure 2:
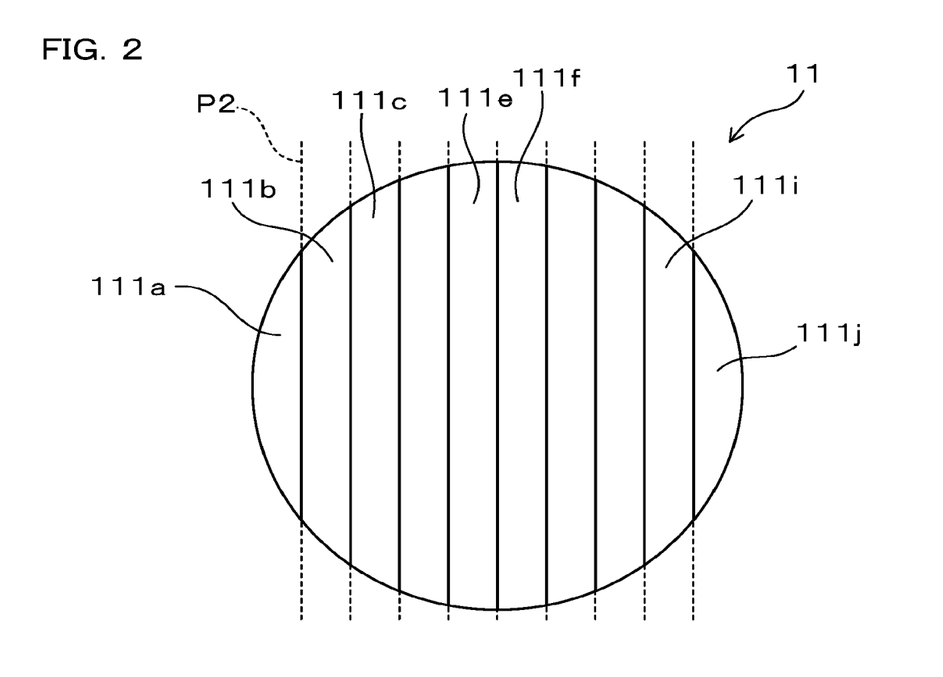
FIG. 2 is an upper view of FIG. 1.

The measurement method for measuring the xylene-insoluble content (A) and the xylene-insoluble content (B) will be specifically explained with reference to FIG. 1 and FIG. 2. As shown in FIG. 1, the modified expanded bead 1, which has basically a spherical shape, is cut into two halves along a cutting plane P1 that passes through the center of gravity of the bead 1 to form two half portions 11, 12. Then one half portion 11 of the two half portions 11, 12 is cut along planes P2 perpendicular to the cutting plane P1 to form ten small pieces 111, each having an equal thickness as shown in FIG. 2. For the explanation purpose, in FIG. 2, one of the small pieces 111 positioned at the most left side in FIG. 1 is named as a first small piece 111a and each small piece 111 is named as the second small piece 111b, the third small piece 111c and etc., in turn from the first small piece 111a.

To measure the xylene-insoluble content (B), among the ten obtained small pieces 111a through 111j, the outermost small pieces 111, that is, the first small piece 111a and the tenth small piece 111j, are used. The plurality of modified expanded beads 1 is divided as explained above, and a plurality of small pieces 111a and 111j is collected so that the total mass thereof becomes about 1.0 g. Thus, the total mass of the collected small pieces 111a and 111j is called mass W1 before extraction.

Next, the collected first small pieces 111a and the tenth small pieces 111j are put into the round bottom flask having a capacity of 150 ml, and then about 200 ml xylene is added therein. The round bottom flask is heated by a mantle heater to recirculate the content therein for six hours. After recirculation, the non-melt residue is filtered and separated with the 100-mesh wire. The obtained residue is dried by decompression dryer under the temperature of 80° C. for eight hours, and thereafter the dried residue mass W2 is measured. The mass percentage of the dried residue mass W2 relative to the mass W1 before extraction [(W2/W1)×100](%) is set to be the xylene-insoluble content (B).

Further, Soxhlet Extraction is performed in the same manner as mentioned above, except for using the half portion 12 of the two half portions 11, 12, which was not divided into ten small pieces 111, instead of the first small piece 111a and the tenth small piece 111j. The mass percentage of the dried residue mass W2 relative to the mass W1 before extraction [(W2/W1)×100](%) is set to be the xylene-insoluble content (A).

In order to adjust the xylene-insoluble contents of the coating layer and the expanded bead, the degrees of cross-linking of the coating layer and the expanded bead can be controlled in the manufacturing process of the modified expanded bead. In order to control the degree of cross-linking, for example, a method for restraining the cross-linking reaction of the coating layer by a radical scavenger is applicable. As an example of such radical scavengers, a radical acceptor type antioxidant, such as a phenolic antioxidant, an amine-based antioxidant, etc., a flame retardant which has a function of trapping radicals, such as halogen flame retardant, phorousous flame retardant, etc., or hindered amine light stabilizer can be applicable. As the radical scavenger, a radical acceptor type antioxidant that can effectively trap the radicals is preferably applied, and particularly preferably, the phenolic antioxidant is applied.

It is preferable that the melting point of the radical scavenger is equal to or more than 150° C. and preferably is equal to or more than 200° C. In such a case, it is considered that when the modified expanded bead is manufactured, penetration of the radical scavenger from the coating layer into the expanded beads can be effectively restrained so that the control of the degree of cross-linking of the coating layer and the expanded beads can be more easily made. On the other hand, the melting point of the radical scavenger is preferably set to about 300° C. or less. When the melting point of the radical scavenger is equal to or less than the temperature above, the radical trapping effect can be effectively performed to more easily control the degree of cross-linking of the coating layer and the expanded beads. Further, the melting point of the radical scavenger is preferably set to be higher than the melting point $T\alpha$ of the base polymer ($\alpha$). It is noted that the melting point of the radical scavenger is obtained from the melting point measurement method defined in the "Measurement Method for Melting Point and Melting Range of Chemical Product" in JIS K0064-1992.

The content of a radical scavenger in the base polymer ($\beta$) is preferably 500 ppm by mass or more and more preferably 1000 ppm by mass or more. It is still more preferable to be 3000 ppm by mass or more. By defining the amount of the radical scavenger in the base polymer ($\beta$) to be in the range as defined above, the cross-linking reaction of the coating layer by the cross-linking agent can be suppressed by the radical scavenger, which can easily restrain rising of the cross-linking degree of the coating layer.

On the other hand, the content of the radical scavenger in the base polymer ($\beta$) is preferably 30000 ppm by mass or less, more preferably 10000 ppm by mass or less, and still more preferably 7000 ppm by mass or less. By defining the amount of the radical scavenger in the base polymer ($\beta$) to be in the range as defined above, the increase of cost of a modified expanded bead and reduction of cross-linking degree of the expanded beads can be restricted. It is noted that the amount of the radical scavenger in the base polymer ($\beta$) can be obtained from the amount of a radical scavenger blending into the base polymer ($\beta$).

[Manufacturing Method for a Modified Expanded Bead]

The modified expanded bead can be manufactured, for example, by the manufacturing method which includes:

a bead forming step for forming a modified bead in a non-expanded state including a non-expanded state core layer including a base polymer ($\alpha$), and a coating layer including a base polymer ($\beta$) and covering at least part of the core layer and;

a cross-linking step for cross-linking the base polymer ($\alpha$) by impregnating a cross-linking agent into the non-expanded bead;

an impregnation step for impregnating an expanding agent into the non-expanded bead; and an expanding step for expanding the non-expanded bead.

It is noted here that the "modified bead in a non-expanded state" may be referred to as a "non-expanded bead".

Bead Forming Step:

The bead forming step is not limited to any particular embodiment, but for example, the following can be applied as one embodiment. First, a resin compound including the base polymer ($\alpha$) and a resin compound including the base polymer ($\beta$) are co-extruded to prepare a strand which includes the core layer including the base polymer ($\alpha$), and the coating layer, which covers an outer circumferential surface of the core layer. Next, the strand is cut into a desired size by a pelletizer, etc., to obtain the non-expanded bead. When any additive and/or a radical scavenger, etc., is added into the core layer and the coating layer, such additive(s) is kneaded into the resin compound including the base polymer ($\alpha$) and/or the resin compound including the base polymer ($\beta$) in advance before co-extrusion. Or the co-extrusion may be made along with kneading of the additive agent with the resin compounds within the extruding machine to be used for co-extrusion.

It is preferable that the radical scavenger is included in the coating layer of the non-expanded bead. In such a case, in the cross-linking step, the cross-linking reaction of the base polymer ($\beta$) included in the coating layer can be suppressed, and at the same time, the base polymer ($\alpha$) included in the core layer can be cross-linked. As a result, the value of the xylene-insoluble content (B) in the finally obtained modified expanded bead can be easily controlled to be smaller than that of the xylene-insoluble content (A), and the value of the xylene-insoluble content (A) can be easily adjusted to be within the specified range defined above.

Cross-Linking Step:

For the cross-linking step, any embodiment can be applied as long as the base polymer ($\alpha$) can be cross-linked. Since the xylene-insoluble content (A) and the xylene-insoluble content (B) are easily adjusted to a proper range, in the cross-linking step, it is preferable to apply an embodiment in which the cross-linking agent is added to the dispersion medium under a state that the non-expanded beads are dispersed therein. As the dispersion medium, for example, water, ethylene glycol, glycerin, methanol, ethanol, etc., may be applicable. It is preferable to use water as the dispersion medium.

The cross-linking agent may be added in advance or added after the dispersion of the non-expanded beads into the dispersion medium. As the cross-linking agent, any chemical compound may be used as long as such compound can cross-link the olefin-based thermoplastic elastomer included in the base polymer ($\alpha$). As several examples of such chemical compound, a percumyl type compound, such as dicumyl peroxide and tert-butyl cumyl peroxide, a perbutyl type compound, such as 1,1-bis(tert-butylperoxy)-3,3,5-trimethylcyclohexane, 2,5-dimethyl-2,5-di(tert-butylperoxy) hexane, and di-tert-butylperoxide, a perhexyl type compound, such as tert-hexyl peroxybenzoate, etc., and a perocta type compound, such as, 1, 1,3,3-tetramethylbutyl peroxy-2-ethylhexanoate, etc., can be used. These chemical compounds may be used alone or in combination of two or more kinds at a time. It is preferable that as the cross-linking agent, percumyl type compounds and perbutyl type compounds are used, and more preferably, dicumyl peroxide are used.

The blending amount of the cross-linking agent is preferably 0.1 parts by mass or more and 8 parts by mass or less relative to 100 parts by mass of the base polymer ($\alpha$), and more preferably is 0.2 parts by mass or more and 5 parts by mass or less. In such a case, the base polymer ($\alpha$) can be appropriately cross-linked, and a modified expanded bead having excellent molding restorability and mechanical properties can be easily obtained.

In order to restrict the aggregation of non-expanded beads, a dispersing agent or a surfactant may be added into the dispersing medium. As a dispersing agent, for example, an organic dispersing agent, such as polyvinyl alcohol, polyvinyl pyrrolidone, and methyl cellulose, or an inorganic dispersing agent, such as aluminum oxide, zinc oxide, kaolin, mica, magnesium phosphate, or tricalcium phosphate, etc., can be used. Further, as the surfactant, an anionic surfactant, such as sodium oleate, sodium dodecylbenzene sulfonate, and nonionic surfactant, etc., can be used.

In the cross-linking step, from the point of acceleration of cross-linking reaction, it is preferable that the dispersing medium and the non-expanded beads are heated up to the temperature under which the polymer ($\alpha$) is softened, and at the same time, the cross-linking agent starts activation. In more detail, the dispersing medium and the non-expanded beads are heated to the temperature equal to or more than the melting point $T\alpha$ of the base polymer ($\alpha$) and to the temperature equal to or more than one-hour half-life temperature of the cross-linking agent. Further, it is preferable that the holding time of the above temperature in the cross-linking step is equal to or more than one minute and equal to or less than 200 minutes.

Impregnation Step for Impregnating Expanding Agent:

In the step for impregnating an expanding agent, for example, an embodiment can be applied in which the expanding agent is added to the dispersing medium under a state that the non-expanded beads are dispersed in the dispersing medium. When an embodiment in which the cross-linking is employed under the state that the non-expanded beads are dispersed in the dispersing medium in the cross-linking step, the cross-linking step and the impregnation step for impregnating an expanding agent can be performed in series. In other words, the non-expanded beads can be impregnated with the expanding agent without the non-expanded beads being taken out from the dispersing medium after the completion of the cross-linking step.

As the expanding agent, for example, inorganic physical expanding agents such as air, nitrogen, carbon dioxide, argon, helium, oxygen, neon, etc., organic physical expanding agents including aliphatic hydrocarbons such as propane, normal butane, isobutane, normal pentane, isopentane, normal hexane, etc., alicyclic hydrocarbons such as cyclohexane, cyclopentane, etc., halogenated hydrocarbons such as chlorofluoromethane, trifluoromethane, 1,1-difluoroethane, 1,1,1,2-tetrafluoroethane, methyl chloride, ethyl chloride, methylene chloride, dimethyl ether, diethyl ether, methyl ethyl ether, etc., can be used. It is noted that these expanding agents may be used alone or two or more kinds in combination.

The expanding agent is preferably an inorganic physical expanding agent, which imposes small load on the environment and is inexpensive in cost, and more preferably is one or more of nitrogen, air, and carbon dioxide. It is still more preferably to use carbon dioxide.

The addition amount of the expanding agent can be appropriately decided depending on the type of the expanding agent, the bulk density of the desired modified expanded beads, and so on. For example, when the organic physical expanding agent is used, 2 parts by mass or more and 20 parts by mass or less of such organic physical expanding agent may be used relative to 100 parts by mass of the base polymer ($\alpha$). On the other hand, when the inorganic physical expanding agent is used, 0.5 parts by mass or more and 20 parts by mass or less of such inorganic physical expanding agent may be used relative to 100 parts by mass of the base polymer ($\alpha$).

As the dispersing medium, the same dispersing medium used in the cross-linking step may be applied. The same dispersing agent used in the cross-linking step may be added into the dispersing medium.

In the impregnation step for impregnating an expanding agent, from the point of acceleration of impregnation, it is preferable that the dispersing medium and the non-expanded beads are heated up to the temperature under which the polymer ($\alpha$) is softened. In more detail, the dispersing medium and the non-expanded beads are preferably heated to the temperature equal to or more than 100° C., more preferably heated to 130° C. or more, and still more preferably to 140° C. or more.

On the other hand, if the temperature in the impregnation step for impregnating an expanding agent is excessively high, non-expanded beads tend to be fused with one another to form a block, which is a so-called blocking phenomenon. In order to prevent such occurrence of blocking phenomenon, the temperature of the dispersing medium and the non-expanded beads may preferably be set to equal to or less than 180° C., more preferably equal to or less than 170° C., and still more preferably equal to 165° C. or less.

Expanding Step:

In the expanding step, for example, an embodiment can be applied in which the non-expanded beads, including the expanding agent, is softened in a closed container, and then the beads are discharged from the closed container to the atmosphere of which the pressure is lower than the pressure in the closed container. The expanding step can be performed in series with the impregnation step for impregnating an expanding agent. In more concrete, for example, in the impregnation step for impregnating an expanding agent, after impregnating the non-expanded beads with the expanding agent with pressurizing the inside of the closed container, the closed container is opened to expose the content of the container to the atmospheric pressure. Thus, the non-expanded beads are expanded to produce modified expanded beads. Further, in the cross-linking step as explained above, when the embodiment in which the cross-linking is performed under the condition that the non-expanded beads are dispersed in the dispersing medium is applied, the cross-linking step, the impregnation step for impregnating an expanding agent and the expanding step can be performed in series.

[Foam Molded Article of Expanded Beads]

By in-mold molding the modified expanded beads, the foam molded article of expanded beads can be obtained. As an in-mold molding method, for example, the following method is applicable. However, not limited to this method, any type of in-mold molding method which has been known hitherto may be applicable. First, a mold is prepared which is designed to have a shape corresponding to the shape of the molded article to be obtained. Then, the modified expanded beads are filled in the mold, and after filling the mold with the modified expanded beads, steam (vapor) is supplied into the mold to heat the modified expanded beads therein. Under this situation, each bead is fused with each adjacent bead mutually, and secondary expansion of the expanded beads occurs to fill in the gaps between the modified expanded beads so that many of the modified expanded beads filled in the mold are unified. And then, cooling down the mold, the content therein is taken out, which is the foam molded article of expanded beads.

The shape of the foam molded article of expanded beads is not limited to a specific one. For example, the foam molded article of expanded beads may have the size from which a sphere with 50 mm diameter can be cut out. In other words, the foam molded article of expanded beads may be a solid molded article having an external dimension of 50 mm or more in any direction. Such shape includes a spherical shape having a diameter of 50 mm or more or a rectangular shape with one side being 50 mm or more in length.

As explained above, the modified expanded bead includes the expanded beads and the coating layer as specified above and is configured such that the degree of cross-linking of the coating layer is lowered than the degree of cross-linking of the expanded beads. By this configuration, the modified expanded beads have both excellent mechanical properties and excellent fusion performance. Therefore, according to the modified expanded beads, the modified expanded beads existing inside of the molded article can be sufficiently fused, even in a case where the molded article has a shape relatively thick enough for cutting out a sphere having a diameter of 50 mm or has a shape which is much complicated for performing in-mold molding. Further, the foam molded article of expanded beads formed by in-mold molding the modified expanded beads is excellent in fusion among the expanded beads and also in molding restorability. In addition, the foam molded article of expanded beads includes an olefin-based thermoplastic elastomer which is excellent in mechanical properties such as high resilience, flexibility, and restorability. Therefore, it is suitably applicable for a use requiring high resilience, flexibility, and restorability, such as seat cushion, etc.

Further, from another point of view, the foam molded article of expanded beads can be considered to be the following invention. That is, the foam molded article of expanded beads is formed by the modified expanded beads, each of which includes the expanded bead and the coating layer, which covers at least part of the outer surface of the expanded bead, wherein, the expanded bead comprises a base polymer ($\alpha$) including an olefin-based thermoplastic elastomer;

the coating layer comprises a base polymer ($\beta$) including one or more kinds of an olefin-based thermoplastic polymer selected from a group consisting of polyolefin-based resin and an olefin-based thermoplastic elastomer;

a relationship between a melting point T$\alpha$ [° C.] of the base polymer ($\alpha$) and a melting point T$\beta$ [° C.] of the base polymer ($\beta$) satisfies $0 \leq T\alpha - T\beta \leq 20$; and when the foam molded article of the expanded beads is sliced along a skin surface which is in contact with a mold when formed by in-mold molding to form a thin plate with the thickness of 1000 μm including the skin surface, then the thin plate is divided into a first thin piece having a thickness of 100 μm including the skin surface and a second thin piece having a thickness of 900 μm without including the skin surface, a xylene-insoluble content (D) of the first thin piece is lower than the xylene-insoluble content (C) of the second thin piece and the xylene-insoluble content (C) is equal to or more than 10% by mass and equal to or less than 80% by mass.

The skin surface of the foam molded article of expanded beads, i.e., a large part of the surface which has been in contact with the mold upon in-mold molding, is formed by the coating layer of the modified expanded bead. Accordingly, the xylene-insoluble content (D) of the first thin piece, including the skin surface, more correctly reflects the degree of cross-linking of the base polymer ($\beta$) included in the coating layer. On the other hand, in the second thin piece, which does not include the skin surface, the occupation ratio of the expanded bead is large compared to that of the first thin piece. Therefore, the xylene-insoluble content (C) of the second thin piece mainly reflects the degree of cross-linking of the base polymer ($\alpha$) included in the expanded beads.

Accordingly, by lowering the xylene-insoluble content (D) than the xylene-insoluble content (C) and at the same time by setting the value of xylene-insoluble content (C) to be within the above specified range, the foam molded article of expanded beads can be obtained, which has excellent mechanical properties derived from the base polymer ($\alpha$), and at the same time, the foam molded article of expanded beads can be obtained in which the modified expanded beads are sufficiently fused one another.

Further, from the point of achieving the function and the effects explained above much higher, the ratio of xylene-insoluble content (D) relative to the xylene-insoluble content (C), D/C is preferably less than 0.95, and more preferably less than 0.93. On the other hand, the ratio of xylene-insoluble content (D) relative to the xylene-insoluble content (C), D/C is preferably approximately equal to or more than 0.80.

Figure 3:
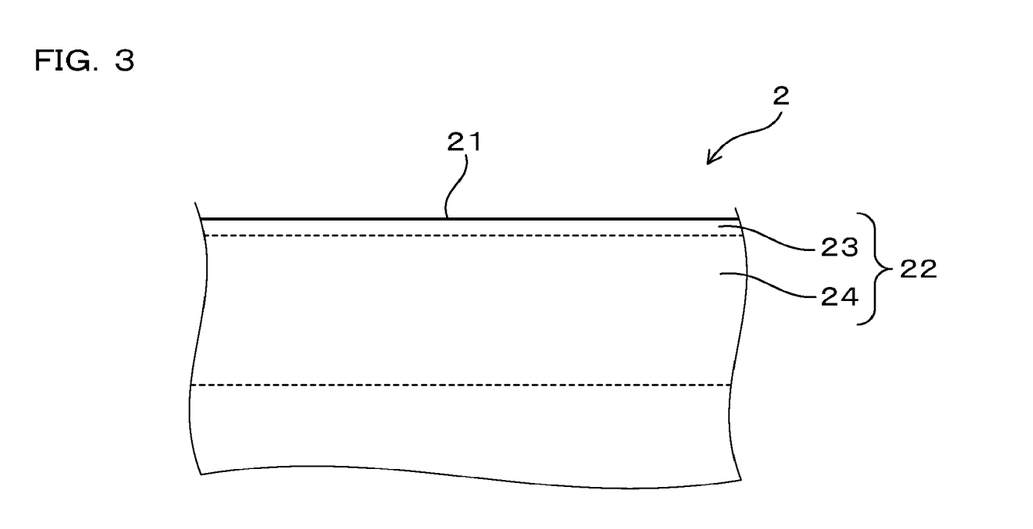
FIG. 3 is an explanatory view showing a dividing method for making thin pieces from the foam molded article of expanded beads.

The measuring method for measuring the xylene-insoluble content (C) and the xylene-insoluble content (D) will be explained with reference to FIG. 3. First, as shown in FIG. 3, a foam molded article 2 of expanded beads is sliced along a skin surface 21, which has been in contact with the mold when formed by in-mold molding, thereby forming a thin plate 22 with a thickness of 1000 μm. Then, the thin plate 22 is sliced along the skin surface 21 to divide the thin plate 22 into a first thin piece 23, including the skin surface 21, and a second thin piece 24 without including the skin surface 21.

Next, the first thin piece 23, including the skin surface 21, is weighed to be about 1 gram to take out. The mass of the first thin piece 23 is defined to be the mass W1 before extraction. Thereafter, Soxhlet Extraction is performed similarly to the case of measurement of xylene-insoluble content (A) to measure the dried residue mass W2. The ratio (percent) of the dried residue mass W2 relative to the mass W1 before extraction [(W2/W1)×100](%) is defined to be the xylene-insoluble content (D).

Similarly, the second thin piece 24 is weighed to be about 1 gram to take out. The total mass of the second thin piece 24 is defined to be the mass W1 before extraction. Thereafter, Soxhlet Extraction is performed similarly to the case of measurement of xylene-insoluble content (A) to measure the dried residue mass W2. The ratio (percent) of the dried residue mass W2 relative to the mass W1 before extraction [(W2/W1)×100](%) is defined to be the xylene-insoluble content (C).

EXAMPLES

Examples and comparative examples of the modified expanded beads will be explained hereinafter.

Examples 1 and 2

Bead Forming Step:

By using a co-extrusion machine in which an extrusion machine with 65 mm inner diameter used for core layer extrusion and an extrusion machine with 30 mm inner diameter used for coating layer extrusion were arranged in parallel and is equipped with dies at the outlet side that can co-extrude a multi-layered strand, strands were prepared.

The olefin-based thermoplastic elastomer (TPO) as the base polymer ($\alpha$) and zinc borate as a cell adjusting agent were supplied in the extrusion machine for core layer extrusion, and the base polymer ($\alpha$) and the cell adjusting agent were kneaded in the extrusion machine. It is noted that as the olefin-based thermoplastic elastomer, in concrete, a multi-block copolymer of polyethylene block and ethylene/α-olefin copolymer block ("INFUSE (registered trademark) Olefin Block Copolymer (OBC) 9530 made by Dow Chemical", melting point: 123° C., density: 0.877 g/cm$^3$) was used. As the cell adjusting agent, zinc borate ("ZINC BORATE 2335" made by Tomita Pharmaceutical Inc.) was used. The blending amount of zinc borate in the base polymer (α) was 1000 ppm by mass.

The polyolefin-based resin as the base polymer (β) and the radical scavenger was supplied in the extrusion machine for coating layer extrusion and the base polymer (β) and the radical scavenger were kneaded in the extrusion machine. It is noted that as the polyolefin-based resin, in concrete, a low-density polyethylene (LDPE) ("LF640MA" made by Japan Polyethylene Inc., melting point: 113° C., density: 0.924 g/cm$^3$) was used. As the radical scavenger, hindered phenol antioxidant ("Irganox 3114" made by BASF Japan Inc., melting point: 220° C.) was used. The blending amount of the radical scavenger in the base polymer (β) is indicated in Table 1.

Thereafter, a molten kneaded product was co-extruded from each extrusion machine so that the mass ratio of the core layer and the coating layer became the value listed in Table 1. Each molten kneaded product extruded from each extrusion machine was merged in the die and extruded into a shape of a multi-layered strand, in which the outer periphery of the core layer was covered by the coating layer, from a pore provided in a nozzle attached at the tip end of the extrusion machine. By water-cooling the co-extruded product, a multi-layered strand was obtained. The diameter of the strand is about 2 mm.

The obtained strand was cut by the pelletizer so as to have a mass of about 5 mg. Thus, the modified bead in the non-expanded state was obtained, which includes a core layer in columnar shape including the base polymer (α) and a coating layer including the base polymer (β) and the radical scavenger and covering a circumferential surface of the core layer.

(Cross-Linking Step, Impregnation Step for Impregnating an Expanding Agent, and Expanding Step)

In this example, the cross-linking step, the impregnating step, and the expanding steps were performed in series. First, the non-expanded beads of 1 kg, the cross-linking agent with the ratio relative to 100 parts by mass of the non-expanded beads indicated in Table 1, and three litters of water as the dispersing medium were encapsulated in the closed container. It is noted that in this embodiment, kaolin as the dispersing agent and organic peroxide (PERCUMYL-D: NOF Corporation) as the cross-linking agent were used.

Thereafter, the closed container was heated to the temperature of 160° C. with stirring the inside thereof. By keeping this temperature for 45 minutes, the cross-linking agent was impregnated in the non-expanded beads, and at the same time, the base polymer (α) and the base polymer (β) were cross-linked. The cross-linking agent advanced into the non-expanded beads was decomposed gradually due to the heat to generate radicals which were the starting point of the cross-linking reaction. However, since the radical scavenger is included in the coating layer of the non-expanded bead, the generated radicals were trapped by the radical scavenger. Therefore, the progress of cross-linking reaction of the base polymer (β) could be retarded. On the other hand, since the radical scavenger was not included in the core layer, the cross-linking reaction of the base polymer (α) could easily progress. Accordingly, in the non-expanded beads that finished the cross-linking step, the degree of cross-linking of the coating layer became lower than the degree of the cross-linking of the core layer.

Next, the impregnation step for impregnating the expanding agent was performed. In the impregnation step, carbon dioxide as the expanding agent was supplied in the closed container to adjust the pressure in the container to be 1.8 MPa (G) by gauge pressure after the cross-linking step was completed. Thereafter, the container was heated until the container reached 155° C. with stirring the inside thereof. By keeping this expanding temperature for 45 minutes, the non-expanded bead was impregnated with the expanding agent.

Thereafter, the expanding step was performed. In the expanding step, the closed container was opened to expose the content therein to the atmospheric pressure to thereby expand the core layer. Thus, the modified expanded bead having a sheath core structure was obtained, which includes the expanded beads and the coating layer which covers the surface of the expanded beads.

Comparative Examples 1, 2

Comparative Examples 1 and 2 show examples of expanded beads (Comparative Examples 1 and 2), including an olefin-based thermoplastic elastomer as the base polymer (α). The manufacturing method of Comparative Examples 1 and 2 is the same as that of Examples 1 and 2, except that the coating layer was not formed on the surface of the core layer in the bead forming step.

Comparative Example 3

Comparative Example 3 is an example of modified expanded beads in which the radical scavenger was not added into the coating layer in the manufacturing step. The manufacturing method of Comparative Example 3 is the same as that of Examples 1 and 2, except that the radical scavenger was not added into the coating layer in the bead forming step.

Comparative Example 4

Comparative Example 4 is an example of modified expanded beads in which the component of the base polymer (β) of the coating layer was changed from the low-density polyethylene to the linear low-density polyethylene (LLDPE). The manufacturing method of Comparative Example 4 is the same as that of Examples 1 and 2, except that component of the base polymer (β) was changed to the LLDPE. It is noted that the LLDPE used in this example was "KC570S" made by Japan Polyethylene Inc. (melting point: 100° C. and density: 0.906 g/cm$^3$).

Comparative Example 5

Comparative Example 5 is an example of modified expanded beads in which the component of the base polymer (β) of the coating layer was changed from the low-density polyethylene to the high-density polyethylene (HDPE). The manufacturing method of Comparative Example 5 is the same as that of Examples 1 and 2, except that component of the base polymer (β) was changed to the HDPE. It is noted that the HDPE used in this example was "1200" made by Toso Inc. (melting point: 135° C. and density: 0.952 g/cm$^3$).

Using the modified expanded beads and the expanded beads, measurement of an apparent density, measurement of a xylene-insoluble content, evaluation of a moldability, and evaluation of mechanical properties were performed as indicated below.

(Apparent Density)

Weighing precisely the mass of a bead group formed by large numbers of modified expanded beads or expanded beads, then a measuring cylinder with water therein was prepared, and the bead group was completely immersed in the water, using a wire net. Then the volume of the bead group was obtained from the rising amount of the liquid surface level. The mass of the beads thus obtained was divided by the volume to calculate the apparent density of the modified expanded beads or the expanded beads. In the column of "apparent density" in Table 1, the apparent density values of the examples and the comparative examples are shown.

(Measurement of Xylene-Insoluble Content)

As shown in FIG. 1, the modified expanded bead 1 of approximately spherical shape or the expanded bead (not shown in the figure) was cut to make two half pieces 11, 12, along the cutting plane P1 passing through the center of gravity to divide the modified expanded bead 1 or the expanded bead evenly into two parts. Then, one half piece 11 of the two half pieces 11, 12 was cut along the plane P2 perpendicular to the cutting plane P1 to thereby prepare ten small pieces 111 having an equal thickness (first small piece 111a to tenth small piece 111j).

A plurality of the modified expanded bead 1 was cut as explained above, and among the ten small pieces 111a through 111j, the small pieces 111 that are positioned at the outermost side, that is the first small pieces 111a and tenth small pieces 111j were collected so that the total mass thereof becomes about 1.0 g. The total by mass of thus collected first small pieces 111a and tenth small pieces 111j is referred to as a mass W1 before extraction.

Next, the above-mentioned first small pieces 111a and the tenth small pieces 111j were put into the round bottom flask, which capacity is 150 ml. Then, about 200 ml xylene was added. After the round flask was heated by a mantle heater to recirculate the content therein for six hours, the non-melt residue is filtered and separated with the 100-mesh wire. The obtained residue is dried by decompression dryer under the temperature of 80° C. for eight hours, and thereafter the mass W2 of the dried residue was measured. The mass percentage of the mass W2 of the dried residue relative to the mass W1 before extraction [(W2/W1)×100] (%) is defined to be the xylene-insoluble content (B).

Further, the other half portion 12 of the two half portions 11 and 12, which was not cut into small pieces 111, was collected so that the total mass thereof becomes about 1.0 g. By using thus collected other half portions 12, the xylene-insoluble content (A) was measured in the same way as in the xylene-insoluble content (B).

The xylene-insoluble contents (A) and (B) of the examples and the comparative examples, and the ratio B/A of the xylene-insoluble content (B) relative to the xylene-insoluble content (A) are shown in Table 1.

(Moldability)

In order for evaluation of the moldability, in-mold molding was performed on the modified expanded beads or the expanded beads according to the following method to thereby prepare the foam molded article of expanded beads. First, the modified expanded beads or the expanded beads were filled in a mold with a cavity which can mold a foam molded article of expanded beads having a dimension of 250 mm in height, 250 mm in width, and 60 mm in breadth. Thereafter, steam with the gauge pressure indicated in "Steam Pressure" of Table 1 was supplied into the mold so that the modified expanded beads or the expanded beads were secondarily expanded, and each bead was fused to one another. It is noted that during in-mold molding, the amount of supplied steam was controlled so that the average of surface pressure, which was applied on the mold due to secondary expansion of the modified expanded beads or the expanded beads, became the value as indicated in "Average Surface Pressure" of Table 1.

Thereafter, the foam molded article of expanded beads was taken out from the mold and placed in the oven to be cured and dried at the temperature of 60° C. Using the cured and dried molded article, which was taken out from the oven, measurement of the bulk density of the molded article and evaluations of the fusion and restorability of the molded article were performed according to the following method.

Bulk Density of Molded Article of Expanded Beads

The bulk density was calculated such that the mass of the molded article was divided by the volume thereof, which was obtained from the external dimensions of each foam molded article. The bulk density of each foam molded article is as indicated in Table 1.

Fusion:

The molded article was cut into two equal pieces in a vertical direction using a cutter to expose the cross-section. By visually observing the exposed cross-section, the size of the gaps between the adjacent beads and whether any dropping of beads occurred or not were evaluated.

In the column of "Fusion" in Table 1, the evaluation result is indicated with "Good" when there was no gap between the adjacent beads at the cross-section and no dropping of the beads was found, with "Poor" when any gap between the adjacent beads was found and which size was less than 1 mm at the longest distance therebetween, or very few beads were dropped off from the cross-section, and with "Bad" when a gap between the adjacent beads was found and which size was 1 mm or more at the longest distance therebetween, or a large number of beads was dropped off from the cross-section. Regarding the evaluation of fusion, if the evaluation was "Good" where no gap was found between the adjacent beads at the cross-section, and no dropping of the beads was found, it is considered that the fusion was excellent and was judged to be accepted. If the evaluation was "Poor" or "Bad" where any gap between the adjacent beads was found, or any dropping of beads from the cross-section was found, it is considered that the fusion is not excellent and was judged to be not accepted.

Molding Restorability

The thickness of the foam molded article of expanded beads was measured at the position 10 mm inside from the outer circumferential brim edge and the thickness of the center portion in a plan view as viewed from the thickness direction. In the column "Molding Restorability" in Table 1, "Good" means that the thickness ratio of the center portion relative to the outer circumferential brim edge portion is 90% or more, expressed as the percentage of the latter relative to the former, and "Poor" means that the thickness ratio was less than 90%. In the evaluation of the molding restorability, the situation of "Good" in which the thickness ratio is equal to or more than 90% was judged to be accepted because of its excellent molding restorability, and the situation of "Poor" in which the thickness ratio is less than 90% was judged to be not accepted.

(Xylene-Insoluble Content of Foam Molded Article of Expanded Beads)

As shown in FIG. 3, the foam molded article 2 of expanded beads was sliced along a skin surface 21 which had been in contact with a mold during in-mold molding, thereby forming a thin plate 22 with the thickness of 1000

μm including the skin surface 21 and the thin plate 22 was divided into a first thin piece 23 having a thickness of 100 μm including a skin surface and a second thin piece 24 having a thickness of 900 μm without including the skin surface 21.

Next, the first thin piece 23, including the skin surface 21, was weighed to be about 1 gram to take out. The mass of the first thin piece 23 is defined to be the mass W1 before extraction. Thereafter, Soxhlet Extraction was performed similarly to the case of measurement of xylene-insoluble content (A) to measure the dried residue mass W2. The ratio (percent) of the dried residue mass W2 relative to the mass W1 before extraction [(W2/W1)×100](%) was defined to be the xylene-insoluble content (D).

Similarly, the second thin piece 24 was weighed to be about 1 gram to take out. The mass of the second thin piece 24 is defined to be the mass W1 before extraction. Thereafter, Soxhlet Extraction was performed similarly to the case of measurement of xylene-insoluble content (A) to measure the dried residue mass W2. The ratio (percent) of the dried residue mass W2 relative to the mass W1 before extraction [(W2/W1)×100](%) was defined to be the xylene-insoluble content (C).

The xylene-insoluble content (C) and the xylene-insoluble content (D) of the examples and the comparative examples, and the ratio D/C of the xylene-insoluble content (D) relative to the xylene-insoluble content (C) were obtained as shown in Table 1.

TABLE 1

| | | Unit | Example 1 | Example 2 | Example 3 | Comparative Example 1 |
|---|---|---|---|---|---|---|
| Expanded Bead | Base Polymer (α) | — | TPO | TPO | TPO | TPO |
| | Melting Point Tα | ° C. | 123 | 123 | 123 | 123 |
| Coating Layer | Base Polymer (β) | — | LDPE | LDPE | TPO | None |
| | Melting Point Tβ | ° C. | 113 | 113 | 123 | — |
| | Blending Amount of Radical Scavenger | ppm by mass | 1000 | 5000 | 10000 | 0 |
| Mass Ratio (Expanded Bead:Coating Layer) | | — | 95:5 | 95:5 | 95:5 | — |
| Cross-linking Step | Blending Amount of Cross-linking Agent | phr | 0.80 | 0.80 | 0.85 | 0.80 |
| Impregnation Step for Impregnating Expanding Agent | Heating Temperature | ° C. | 155 | 155 | 155 | 155 |
| | Pressure in Container | MPa | 1.8 | 1.8 | 2 | 1.8 |
| | Holding Time | min | 45 | 45 | 45 | 45 |
| Modified Expanded Beads | Apparent Density | kg/m$^3$ | 160 | 160 | 138 | 160 |
| | Xylene-insoluble Content (A) | % | 51 | 51 | 49 | 50 |
| | Xylene-insoluble Content (B) | % | 46 | 48 | 44 | 50 |
| | Xylene-insoluble Content (A) − Xylene-insoluble Content (B) | — | 5 | 3 | 5 | 0 |
| | Ratio of Xylene-insoluble Contents B/A | — | 0.90 | 0.94 | 0.90 | 1.00 |
| In-mold Molding | Average Surface Pressure | MPa | 0.15 | 0.15 | 0.15 | 0.15 |
| | Steam Pressure | MPa(G) | 0.18 | 0.18 | 0.18 | 0.18 |
| Foam Molded Article of Expanded Beads | Xylene-insoluble Content (C) | % | 48 | 48 | 47 | 48 |
| | Xylene-insoluble Content (D) | % | 46 | 44 | 43 | 48 |
| | Xylene-insoluble Content (C) − Xylene-insoluble Content (D) | — | 2 | 4 | 4 | 0 |
| | Ratio of Xylene-insoluble Contents D/C | — | 0.96 | 0.92 | 0.91 | 1.00 |
| | Bulk Density | kg/m$^3$ | 120 | 120 | 102 | 120 |
| | Thickness | mm | 60 | 60 | 60 | 60 |
| | Fusion | — | good | good | good | bad |
| | Molding Restorability | — | good | good | good | good |

| | | Comparative Example 2 | Comparative Example 3 | Comparative Example 4 | Comparative Example 5 |
|---|---|---|---|---|---|
| Expanded Bead | Base Polymer (α) | TPO | TPO | TPO | TPO |
| | Melting Point Tα | 123 | 123 | 123 | 123 |
| Coating Layer | Base Polymer (β) | None | LDPE | LLDPE | HDPE |
| | Melting Point Tβ | — | 113 | 100 | 135 |
| | Blending Amount of Radical Scavenger | 0 | 0 | 5000 | 5000 |
| Mass Ratio (Expanded Bead:Coating Layer) | | — | 95:5 | 95:5 | 95:5 |
| Cross-linking Step | Blending Amount of Cross-linking Agent | 0.76 | 0.80 | 0.80 | 0.80 |
| Impregnation Step for Impregnating Expanding Agent | Heating Temperature | 155 | 155 | 155 | 155 |
| | Pressure in Container | 1.7 | 1.8 | 1.8 | 1.8 |
| | Holding Time | 45 | 45 | 45 | 45 |
| Modified Expanded Beads | Apparent Density | 160 | 160 | 145 | 145 |
| | Xylene-insoluble Content (A) | 34 | 48 | 44 | 53 |
| | Xylene-insoluble Content (B) | 39 | 49 | 51 | 44 |
| | Xylene-insoluble Content (A) − Xylene-insoluble Content (B) | −5 | −1 | −7 | 9 |
| | Ratio of Xylene-insoluble Contents B/A | 1.15 | 1.02 | 1.16 | 0.83 |
| In-mold Molding | Average Surface Pressure | 0.15 | 0.15 | 0.15 | 0.15 |
| | Steam Pressure | 0.16 | 0.20 | 0.20 | 0.24 |
| Foam Molded Article of Expanded Beads | Xylene-insoluble Content (C) | 36 | 46 | 40 | 48 |
| | Xylene-insoluble Content (D) | 37 | 47 | 44 | 45 |
| | Xylene-insoluble Content (C) − Xylene-insoluble Content (D) | −1 | −1 | −4 | 3 |
| | Ratio of Xylene-insoluble Contents D/C | 1.03 | 1.02 | 1.10 | 0.94 |
| | Bulk Density | 120 | 120 | 100 | 100 |
| | Thickness | 60 | 60 | 60 | 60 |
| | Fusion | good | poor | poor | poor |
| | Molding Restorability | bad | good | good | good |

As shown in Table 1, the modified expanded beads of Examples 1, 2, and 3 include the specific expanded beads and the coating layers. The difference Tα−Tβ between the melting point Tα of the base polymer (α) and the melting point Tβ of the base polymer (β), and the value of the xylene-insoluble content (A) were within the specified range. The value of xylene-insoluble content (B) was smaller than the value of xylene-insoluble content (A). Therefore, the modified expanded beads were excellent in both fusion and moldability.

The expanded beads of Comparative Example 1 did not have the coating layer, and therefore, the value of the xylene-insoluble content (A) was approximately the same as the value of the xylene-insoluble content (B). In other words, in the expanded beads of Comparative Example 1, the degree of cross-linking on the surface and the degree of cross-linking inside were approximately the same. Therefore, the expanded beads of Comparative Example 1 were inferior in fusion, and the adjacent expanded beads were not sufficiently fused during in-mold molding.

The additive amount of the cross-linking agent in the expanded beads of Comparative Example 2 was reduced compared to the additive amount of the cross-linking agent in the expanded beads of Comparative Example 1. As a result, the value of xylene-insoluble content (B) became larger than the value of xylene-insoluble content (A). In other words, in the expanded beads of Comparative Example 2, the degree of cross-linking inside became lower than that at the outer surface. Therefore, the expanded beads of Comparative Example 2 were inferior in molding restorability, and accordingly, the contraction amount at the central portion of the foam molded article of expanded beads became large after the in-mold molding.

Because the radical scavenger was not added in the coating layer of the modified expanded beads of Comparative Example 3, the value of xylene-insoluble content (B) became larger than the value of xylene-insoluble content (A). In other words, in the modified expanded beads of Comparative Example 3, the degree of cross-linking inside became lower than the degree thereof at the outer surface. Therefore, the expanded beads of Comparative Example 3 were inferior in fusion, and accordingly, the expanded beads were not sufficiently fused one another upon in-mold molding.

The difference Tα−Tβ between the melting point Tα of the base polymer (α) and the melting point Tβ of the base polymer (β) of the modified expanded beads of Comparative Example 4 exceeded 20° C. Further, in the modified expanded beads of Comparative Example 4, the value of xylene-insoluble content (B) became larger than the value of xylene-insoluble content (A). Therefore, the modified expanded beads of Comparative Example 4 were inferior in fusion, and accordingly, the modified expanded beads were not sufficiently fused upon in-mold molding.

The difference Tα−Tβ between the melting point Tα of the base polymer (α) and the melting point Tβ of the base polymer (β) of the modified expanded beads of Comparative Example 5 was less than 0° C. Therefore, the modified expanded beads of Comparative Example 5 were inferior in fusion, and accordingly, the modified expanded beads were not sufficiently fused with one another upon in-mold molding.

The invention claimed is:

1. A modified expanded bead comprising an expanded bead and a coating layer which covers at least part of an outer surface of the expanded bead; wherein:
the expanded bead comprises a base polymer (α) comprising an olefin-based thermoplastic elastomer;
the coating layer comprises a base polymer (β) comprising one or more kinds of an olefin-based thermoplastic polymer selected from the group consisting of a polyolefin-based resin and an olefin-based thermoplastic elastomer;
a relationship between a melting point Tα [° C.] of the base polymer (α) and a melting point Tβ [° C.] of the base polymer (β) satisfies 0≤Tα−Tβ≤20; and
when the modified expanded bead is cut into two halves along a cutting plane to form two half portions, and thereafter one of the two half portions is cut along planes perpendicular to the cutting plane to form ten small pieces, each small piece having an equal thickness to one another, outermost pieces among the ten small pieces have a xylene-insoluble content (B) which is less than a xylene-insoluble content (A) included in another of the two half portions, and the xylene-insoluble content (A) is equal to or more than 10% by mass and equal to or less than 80% by mass.

2. The modified expanded bead according to claim 1, wherein a ratio (B/A) of the xylene-insoluble content (B) relative to the xylene-insoluble content (A) is less than 0.95.

3. The modified expanded bead according to claim 1, wherein a ratio by mass of the expanded bead and the coating layer is defined as expanded bead/coating layer=70/30 to 99.5/0.5.

4. The modified expanded bead according to claim 1, wherein the base polymer (β) comprises polyethylene-based resin.

5. The modified expanded bead according to claim 4, wherein the polyethylene-based resin is a low-density polyethylene.

6. The modified expanded bead according to claim 1, wherein the melting point Ta of the base polymer (α) is equal to or more than 110° C. and equal to or less than 130° C.

7. A foam molded article of expanded beads which is formed by in-molding the modified expanded bead according to claim 1.

8. The foam molded article of the expanded bead according to claim 7 which has a size such that a sphere with a diameter of 50 mm can be cut out therefrom.

9. A foam molded article of expanded beads which comprises a modified expanded bead comprising an expanded bead and a coating layer which covers at least part of an outer surface of the expanded bead, wherein:
the expanded bead comprises a base polymer (α) comprising an olefin-based thermoplastic elastomer;
the coating layer comprises a base polymer (β) which comprises one or more kinds of an olefin-based thermoplastic polymer selected from the group consisting of a polyolefin-based resin and an olefin-based thermoplastic elastomer;
a relationship between a melting point Tα [° C.] of the base polymer (a) and a melting point Tβ [° C.] of the base polymer (B) satisfies 0≤Tα−Tβ≤20; and
when the foam molded article is sliced along a skin surface which has been in contact with a mold when the foam molded article of expanded beads is formed by an in-mold molding to form a thin plate with a thickness of 1000 μm including the skin surface, then the thin plate is divided into a first thin piece having a thickness of 100 μm including the skin surface and a second thin piece having a thickness of 900 μm without including the skin surface, a xylene-insoluble content (D) of the first thin piece becomes lower than the xylene-insoluble content (C) of the second thin piece, and the xylene-insoluble content (C) is equal to or more than 10% by mass and equal to or less than 80% by mass.

\* \* \* \* \*